Patented Nov. 21, 1944

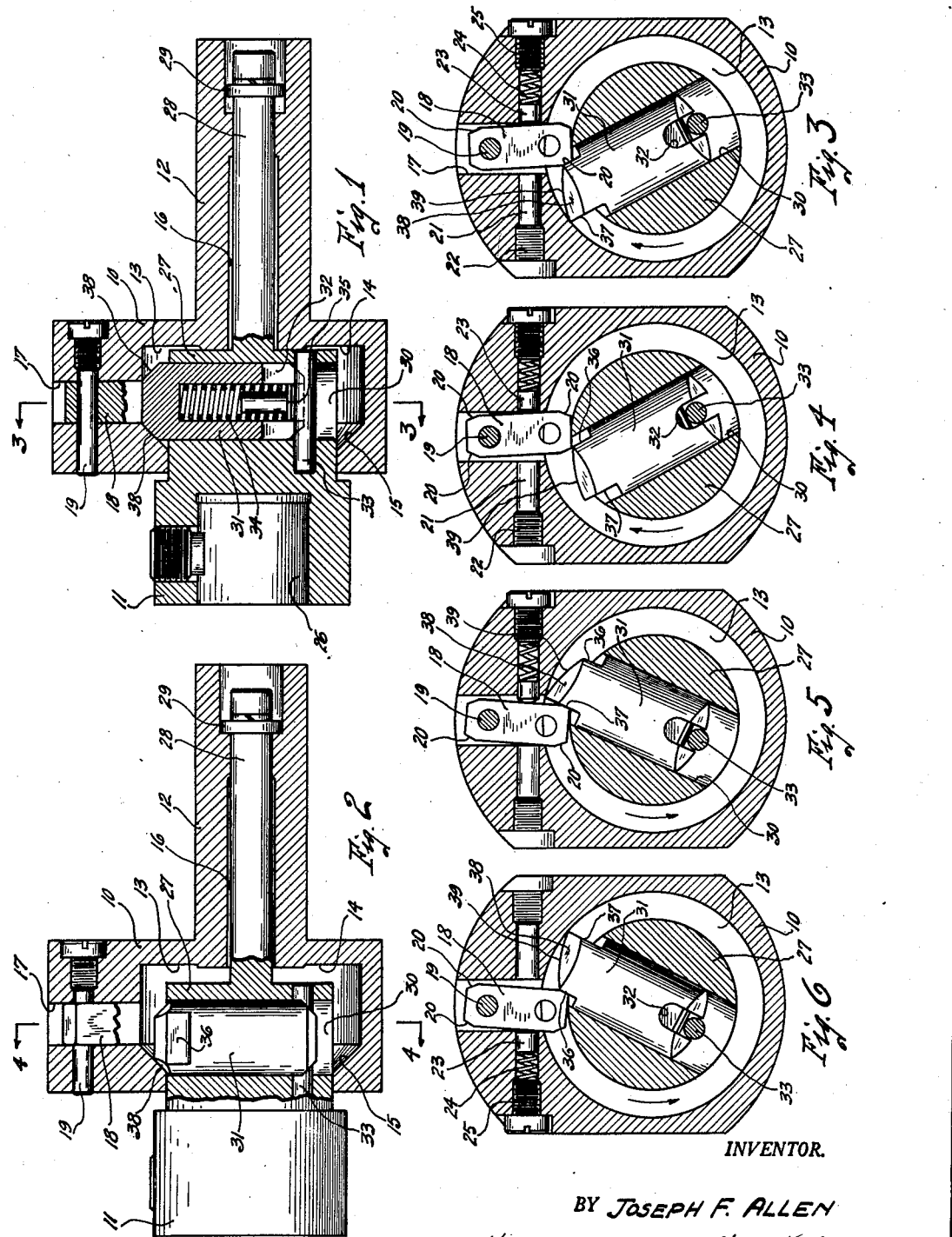

2,363,379

UNITED STATES PATENT OFFICE 2,363,379

CLUTCH TAP AND DIE HOLDER

Joseph F. Allen, Silver Spring, Md., assignor to The Warner & Swasey Company, Cleveland, Ohio, a corporation of Ohio Application July 14, 1943, Serial No. 494,652

9 Claims. (Cl. 10—89)

This invention relates to a novel and improved clutch tap and die holder.

An object of the invention is to provide an improved and novel clutch tap and die holder which is efficient and accurate in operation, is simple in construction and is so designed as to provide minimum wear of the various parts and consequently long life for the tap and die holder.

A further object is to provide an improved and novel clutch tap and die holder which is so constructed as to eliminate damaging contact between the relatively movable parts and particularly the knife edges thereof when the main units of the holder are in unclutched relationship.

Another object is to provide an improved and novel clutch tap and die holder which is so designed as to be readily adapted for use with taps or dies for cutting either right or left hand threads.

Further and additional objects and advantages not hereinbefore specified will become apparent during the detailed description of an embodiment of the invention and which description is to follow.

Referring to the accompanying drawing,

Fig. 1 is a longitudinal sectional view through a clutch tap and die holder embodying the invention.

Fig. 2 is a view similar to Fig. 1 but illustrating the parts of the clutch tap and die holder in different relationship.

Fig. 3 is a transverse sectional view through the clutch tap and die holder and is taken substantially on line 3—3 of Fig. 1, looking in the direction of the arrows.

Fig. 4 is a transverse sectional view taken substantially on line 4—4 of Fig. 2, looking in the direction of the arrows.

Fig. 5 is a transverse sectional view through the clutch tap and die holder similar to Figs. 3 and 4, but showing the parts in a different relationship, and Fig. 6 is a transverse sectional view through the clutch tap and die holder similar to Figs. 3, 4 and 5 but showing the parts of the holder in the relationship they have when the threads to be cut are of the opposite hand to the threads to be cut when the parts are in the relationship shown in the previous views.

The clutch tap and die holder embodying the present invention and illustrated in the drawing comprises two main units, namely, the body unit 10 and the tap or die carrying unit 11. The body 10 is substantially cylindrical in shape and is provided, in this instance, with an attaching shank 12 disposed eccentrically to the body and which shank extends into the opening in the face of a turret or similar tool carrying member of a machine tool as is readily understood in the art. The body 10 is provided with an internal cylindrical chamber 13 that is concentric to the shank 12 but eccentric to the body 10 to provide diametrically opposite portions on the latter of different thickness. The end wall 14 of the chamber adjacent to the shank 12 is perpendicular to the axis of the shank 12. The body 10 is also provided with an opening of smaller diameter communicating with the chamber 13 and concentric to said chamber and the shank 12. The end wall 15 of the chamber 13 adjacent to said opening is of conical formation, as clearly shown in the drawing, and provides a camming surface for a purpose later to be explained. The shank 12 of the body unit is provided with a centrally disposed bore 16 therethrough and which bore has a bearing portion of reduced diameter intermediate its ends for a purpose later to be explained.

The body 10 is provided in the thicker portion thereof with a radial slot 17 extending from the periphery of the body inwardly to the chamber 13. An abutment member 18 which may be designated as a pendulum is rockably mounted in the slot 17 on a removable pin 19 carried by the body 10 and extending transversely of the slot 17 parallel to the axis of the shank and passing through an opening in the pendulum member 18 adjacent the outer end of the latter. The inner end of the pendulum member 18 is located within the chamber 13 of the body 10. The pendulum 18 is elongated and has its diagonally opposite corners beveled to provide at each end a plurality of contact surfaces 20 for a purpose later to be explained. The member or pendulum 18 is also provided with an opening adjacent its inner end and arranged symmetrically with respect to the opening in the member that is adjacent the outer end thereof, wherefore if desired the pin 19 can be withdrawn and the pendulum member 18 reversed to bring its opposite end into the chamber 13. This may be done in case the inner end of the pendulum member becomes worn in use.

The body 10 is provided with aligned openings 21 extending transversely to the slot 17 and located on opposite sides thereof and which openings communicate at their outer ends with threaded counterbores 22. A plunger 23 is slidably mounted in one or the other of the openings 21, depending upon the hand of the thread to be cut as, for example, in Fig. 3 for a right hand thread the plunger 23 is mounted in the right hand opening 21, while in Fig. 6 when the tap and die holder is used for cutting left hand threads the plunger 23 is mounted in the left hand opening 21. The plunger 23 is spring-pressed by means of a coil spring 24 which abuts the outer end of the plunger and the inner end of a screw 25 secured in the threaded counterbore 22. The inner end of the plunger 23 engages the side of the pendulum member 18 and rocks said pendulum in a clockwise direction as viewed in Fig. 3 to hold the opposite side of the pendulum in contact with the left hand side wall of the slot 17.

The tap or die carrying unit 11 comprises a portion extending outwardly of the body 10 and provided with a tool socket 26 and in which socket the tool, such as a tap or die, can be secured by means of clamping screws or other suitable well known means. The tap or die carrying unit 11 has a portion 27 which extends into the chamber 13 and rotatably interfits the opening in the body 10 which communicates with said chamber. A shaft 28 extends from the portion 27 and passes through the bore 16 of the shank 12 and rotatably interfits the reduced bearing portion of said bore. The outer end of the shaft 28 is provided with a shouldered washer 29 held in position by a screw as is well understood in the art. The tap and die carrying unit 11 has a limited relative endwise movement in the body 10 and the limits of such movement are defined by the engagement of the inner end of the portion 27 of the unit 11 with the end wall 14 of the chamber 13 as shown in Fig. 1 and by the engagement of the shouldered washer 29 with the shoulder formed by the reduced bearing portion of the bore 16 as shown in Fig. 2.

The portion 27 of the tap or die carrying unit is provided with a diametrically extending opening 30 therethrough and in which opening there is slidably mounted a clutch member 31. The lower end of the clutch member 31, as viewed in the drawing, is provided with a transverse slot 32 through which extends a pin 33 carried by the portion 27 and extending transversely of the opening 30. The pin 33 when positioned in the slot 32 prevents the clutch member from turning in the opening 30 but allows sliding movement thereof in said opening. The clutch member 31 is provided with a centrally located recess extending longitudinally of the clutch member from the inner end thereof and in which recess a coil spring 34 is mounted and abuts the end of the recess and a shouldered washer 35 which washer, in turn, contacts the pin 33. The spring 34 constantly urges the clutch member 31 in a radially outward direction in the opening 30 of the portion 27 of the tap and die carrying unit 11.

The outer end of the clutch member 31 is provided on opposite sides with cutaway portions 36 and 37 and which portions form contact surfaces for cooperation with the contact surfaces 20 of the pendulum member 18. The outer end of the clutch member 31 at right angles to the cutaway portions 36, 37 has beveled surfaces 38 on each side and one or the other beveled surface cooperates with the conical end wall 15 of the chamber 13 for a purpose later to be explained and depending upon the hand of the threads being cut. The extreme outer end of the clutch member 31 is curved to provide a camming surface 39 so shaped that the cutaway portion 37 is longer than the cutaway portion 36, as clearly indicated in Fig. 3 and for a purpose later to be pointed out.

The normal relationship of the body unit 10 and the tap or die carrying unit 11 and the parts associated therewith is indicated in Figs. 1 and 3. It being assumed that the shank 12 is secured in the tool holding member of the slide of a machine tool and that a tap or die is mounted in the socket 26 of the unit 11 the operator will cause the slide to move to bring the tap or die into engagement with the work and will continue such movement while the tap or die is cutting threads in or on the work. During the referred to movement of the slide the inner end of the portion 27 of the unit 11 of the clutch tap and die holder is in contact with the end wall 14 of the chamber 13 of the body unit 10 as shown in Fig. 1 and the contact surface provided by the cutaway portion 36 of the clutch member 31 is in engagement with the left hand contact surface 20 of the pendulum member 18 and said latter member has been rocked in an anti-clockwise direction against the right hand side wall of the slot 17 to move the plunger 23 and compress the spring 24. At this time and during the threading operation the units 10 and 11 of the holder have no relative rotative movement as they are interconnected by the engagement of the pendulum and clutch member. Near the end of the threading operation the movement of the slide is terminated, but due to the engagement of the tap or die with the rotating work piece the unit 11 has endwise movement imparted thereto toward the left and relative to the unit 10. This endwise movement results in the clutch member 31 being cammed radially inwardly against the action of the spring 34 by the engagement of the beveled surface 38 and the conical end wall 15 of the chamber 13. The inward movement of the clutch member 31 continues until the contact surface provided by the cutaway portion 36 is disengaged from the contact surface 20 of the pendulum member 18 as shown in Fig. 4, and at this time the unit 11 is free to rotate with the work and relative to the unit 10. As the unit 11 rotates relative to the unit 10 the curved end 39 of the clutch member 31 engages the inner end of the pendulum member 18 and the clutch member is depressed slightly farther as it passes the pendulum member 18 during each rotation of the unit 11. As soon as the clutch member 31 has passed the pendulum member 18 the spring pressed plunger 23 rocks the pendulum member 18 in a clockwise direction as viewed in the drawing until it engages the opposite side wall of the slot 17. As the rotation continues and the clutch member 31 again passes by the pendulum member 18 it will be noted that the curved surface 39 on the end of the clutch member contacts the inner end of the pendulum 18 while the pendulum is in its left hand rocked position as just explained. This engagement of the curved end of the clutch member 31 with the inner end of the pendulum member 18 momentarily rocks the pendulum toward the right and against the action of the plunger 23 and momentarily slightly depresses the clutch member 31 as it passes by the pendulum. This continues each time the clutch member passes the pendulum during the relative rotation between the body unit 10 and the unit 11.

It will be noted that during said relative rotation between the units 10 and 11 and the passing of the pendulum member 18 by the clutch member 31 the knife edges at the ends of the contact surfaces of said members do not come into contact with each other and therefore will not be worn or damaged during the idle rotation movement just explained. When the operator reverses the rotation of the work piece the unit 11 will turn with the work piece in the reverse direction since it is threadedly connected therewith through the tap or die. This reverse rotation of the unit 11 continues until the larger contact surface formed by the cutaway portion 37 of the clutch member 31 engages the right hand contact surface 20 of the pendulum member 18 as shown in Fig. 5. As soon as this engagement takes place the unit 11 is held against rotation in the reverse direction relative to the unit 10 and consequently the tap or die carried by the unit 11 will back off the thread cut in or on the work piece. Simultaneously with the backing off of the tap or die the operator will cause the slide to move rearwardly to its original position and the tap or die will be withdrawn from the work piece.

Assuming that the operator moves the slide rearwardly at the same rate as the tap or die backs off from the work then as soon as the tap or die is free of the work the units 10 and 11 and the parts carried thereby will be restored to their normal relationship. This is occasioned through the action of the spring 34 in forcing the clutch member 31 radially outwardly, wherefore the beveled surface 38 of the clutch member will ride on the conical end wall surface 15 and effect endwise movement of the unit 11 toward the right and relative to the unit 10 until the parts are in their normal relationship, as shown in Fig. 1.

The description of the clutch tap and die holder previously set forth herein in detail referred to the assembly of the parts in connection with the use of the holder for cutting threads of a particular hand, namely, right hand threads. In Fig. 6 the parts of the clutch tap and die holder are shown assembled for the cutting of threads of the opposite hand, namely, left hand threads. This latter assembly of the parts simply involves withdrawing the unit 11 from the unit 10 by removing the shouldered washer 29 and its retaining screw and then sliding the unit 11 out of the unit 10, it being understood that during this sliding movement of the unit 11 the clutch member 31 is depressed sufficiently to allow the unit 11 to pull through the opening of the unit 10. When the unit 11 has been removed sufficiently from the unit 10 the clutch member 31 is disengaged from the pin 33 by the spring 34 and can then be given a half turn to reverse the relative positions of the contact surfaces formed by the cutaway portions 36 and 37. The unit 11 can then be reinserted in the unit 10 by depressing the clutch member sufficiently to pass through the opening in the unit 10 and when the unit 11 has been positioned in the unit 10 in its normal relationship the shouldered washer 29 and its retaining screw are again secured to the end of the shaft 28. In addition the plunger 23 is moved from the right hand opening 21 in the unit 10, as viewed in the drawing, and mounted in the left hand opening 21 as is also the spring 24 and its retaining screw 25. In other words, the plunger 23 will now contact with the left hand side of the pendulum member 18, as viewed in Fig. 6, instead of with the right hand side of the pendulum member as shown in the preceding views. When the parts of the holder are arranged for the cutting of left hand threads and are in their normal relationship the contacting surfaces of the pendulum member 18 and the clutch member 31 are interengaged and the clutch member holds the pendulum member in rocked position against the left hand side of the slot 17 and the plunger 23 is depressed against the spring 24, as shown in Fig. 6.

The manner in which the parts function when assembled for cutting left hand threads is identical with the manner in which they function when assembled for cutting right hand threads as previously explained.

It will be understood that when they unit 11 is rotating relative to the unit 10 after the parts have been released said unit will rotate in the opposite direction from the direction in which it rotated when released after cutting right hand threads.

From the foregoing description it will have been seen that the sharp or knife edges at the outer ends of the cooperating contacting surfaces of the pendulum member 18 and the clutch member 31 separate upon the commencement of the relative rotation of the unit 11 after the releasing of the parts and do not come into contact during the further relative rotation of the unit 11 and until the parts of the holder are restored to their normal relationship. This is due to the rocking movement of the pendulum member under the action of the plunger 23 and which movement places the knife edge of the pendulum member out of the path of the knife edge of the clutch member.

The separation of the knife edges of the pendulum member and the clutch member so that they do not contact during the idle relative rotation of the unit 11 eliminates damage to said knife edges and thus the accuracy of the clutch tap and die holder is retained throughout its life. It will also be recalled that the pendulum member 18 has four symmetrical contacting surfaces and knife edges and can be reversed so as to utilize all of these surfaces and edges and this feature is a further assurance as to the long life and functional accuracy of the holder.

It will also have been noted that the clutch tap and die holder embodying the present invention is an improvement over the tap and die holders of the prior art due to its simplicity of design and efficiency of operation and its long life and accuracy by virtue of the facility for reversing the parts.

It will also have been noted that the holder can be readily adapted for the cutting of either right or left hand threads by a few simple changes in the assembly of the parts.

Although a preferred embodiment of the invention has been illustrated and described herein it will be understood that the invention is susceptible of various modifications and adaptations within the scope of the appended claims.

Having thus described my invention, I claim:

1. A tap and die holder comprising a unit having a cylindrical chamber therein and a radially extending slot communicating with said chamber, a pendulum member mounted in said slot for movement within the limits of the side walls thereof and extending into said chamber, another unit having a portion extending into said chamber and rotatable and endwise movable therein, said portion being provided with a movable clutch member normally cooperatively engaging said pendulum member to interconnect said units against relative rotation, said clutch member when thus interengaged with said pendulum member holding the latter in one extreme position, said first unit and said clutch member having cooperating portions acting upon relative movement of said portion of said other unit within said chamber to move said clutch member to disengage it from said pendulum member to free said units for relative rotation, said first named unit being provided with means acting upon said pendulum member to move the latter when thus disengaged from said clutch member to its other extreme position.

2. A tap and die holder comprising a pair of relatively rotatable and endwise movable units, one of said units being provided with an internal cylindrical chamber and a radially extending slot communicating therewith, said unit also being provided in the opposite sides of said slot with identical openings in one of which a spring-pressed plunger is mounted, a bearing element carried by said one unit and extending across said slot, a pendulum member rockably mounted in said slot on said element and forcibly held by said spring-pressed plunger against one side or the other of said slot depending upon the location of said plunger, the other of said units having a portion extending into said chamber and provided with a movable clutch member normally cooperating with said pendulum to hold the same against the side of the slot in which the spring-pressed plunger is located and against the action of said plunger during the operation of the holder, said one unit and said clutch member having cooperating portions effective upon endwise movement of said units to move said clutch member to disengage the same from said pendulum whereupon said spring-pressed plunger rocks the pendulum against the opposite wall of the slot.

3. A tap and die holder comprising a pair of relatively rotatable and endwise movable units having portions arranged one within the other, said portion of one of said units having an abutment member movable between predetermined limits and provided with an edge and said portion of the other of said units having a movable clutch member provided with an edge and normally cooperating with said abutment member to hold the latter at one limit of its movement and to interconnect said portions and said units against relative rotation, said portion of said one unit and said clutch member having cooperating camming surfaces acting upon relative endwise movement between said portions and units to disengage said members to free said portions and said units for relative rotation, and means carried by said portion of said one unit and acting on said abutment member to move the same to the other limit of its movement when thus disengaged from said clutch member at which time the edge of the abutment member lies outside of the path of relative rotation of the edge of the clutch member.

4. A tap and die holder comprising a pair of relatively rotatable and endwise movable units having portions arranged one within the other, said portion of one of said units having a pendulum member substantially radially disposed therein and movable between predetermined limits and provided with an edge and said portion of the other of said units having a radially movable clutch member provided with an edge and normally cooperating with said pendulum member to hold the latter at one limit of its movement and to interconnect said portions and said units against relative rotation, said portion of said one unit and said clutch member having cooperating camming surfaces acting upon relative endwise movement between said portions and units to disengage said members to free said portions and said units for relative rotation, and means carried by said portion of said one unit and acting on said pendulum member to move the same to the other limit of its movement when thus disengaged from said clutch member at which time the edge of the abutment lies outside of the path of relative rotation of the edge of the clutch member.

5. A tap and die holder comprising a pair of relatively rotatable and endwise movable units having portions arranged one within the other, the outer of said portions having an abutment member movable between predetermined limits and provided with an edge and the inner of said portions having a movable clutch member provided with an edge and normally cooperating with said abutment member to hold the latter at one limit of its movement and to interconnect said portions and said units against relative rotation, said outer portion and said clutch member having cooperating camming surfaces acting upon relative endwise movement between said portions and units to disengage said members to free said portions and said units for relative rotation, and means carried by said outer portion and acting on said abutment member to move the same to the other limit of its movement when thus disengaged from said clutch member, at which time the edge of the abutment member lies outside of the path of relative rotation of the edge of the clutch member.

6. A tap and die holder comprising a pair of relatively rotatable and endwise movable units having portions arranged one within the other, the outer of said portions having a pendulum member substantially radially disposed therein and movable between predetermined limits and provided with an edge, the inner of said portions having a radially movable clutch member provided with an edge and normally cooperating with said pendulum member to hold the latter at one limit of its movement and to interconnect said portions and said units against relative rotation, said outer portion and said clutch member having cooperating camming surfaces acting upon relative endwise movement between said portions and units to disengage said members to free said portions and said units for relative rotation, and means carried by said outer portion and acting on said pendulum member to move the same to the other limit of its movement when thus disengaged from said clutch member at which time the edge of the pendulum lies outside of the path of relative rotation of the edge of the clutch member.

7. A tap and die holder comprising a pair of relatively rotatable and endwise movable units having portions arranged one within the other, said portion of one of said units having a radial slot and a pendulum member having movement in said slot limited by the side walls thereof, said pendulum member being provided with an edge, said portion of the other of said units having a radially movable clutch member provided with an edge and normally cooperating with said pendulum member to hold the latter against one side wall of said slot and to interconnect said members and said units against relative rotation, said portion and said one unit and said clutch member having cooperating camming surfaces acting upon relative endwise movement between said portions and said units to disengage said members to free said portions and said units for relative rotation, and means carried by said portion of said one unit and acting on said pendulum member to move the same against the other side wall of said slot when thus disengaged from said clutch member at which time the edge of the pendulum member lies outside of the path of relative rotation of the edge of the clutch member.

8. A tap and die holder comprising a pair of relatively rotatable and endwise movable units, one of said units having a substantially cylindrical body provided with a cylindrical chamber therein with the wall of said body at diametrically opposite sides of said chamber of different thickness, the wall of said body of greater thickness being provided with a slot communicating with said chamber and having a pendulum rockable therein and provided with an edge located in said chamber, the other unit having a portion rotatable and endwise movable in said chamber and provided with a movable clutch member having an edge and normally cooperating with said pendulum to hold the latter against one side wall of said slot and to interconnect said body and said portion, wherefore said units are held against relative rotation, said body and said clutch member having cooperating camming surfaces acting upon relative endwise movement between said units to disengage said pendulum and said clutch member to free said body and portion and said units for relative rotation, and means carried by said body and acting on said pendulum to move the same against the other side wall of said slot when said pendulum is disengaged from said clutch member at which time the edge of the pendulum lies outside of the path of relative rotation of the edge of the clutch member.

9. A tap and die holder comprising a unit having a cylindrical chamber therein and a radially extending slot communicating with said chamber, bearing means carried by said unit midway of the side walls of said slot, an elongated member in said slot and extending into said chamber and provided adjacent its opposite ends with bearing openings either of which may cooperate with said means whereby said member can be reversibly mounted in said slot, said member being provided on each of its opposite ends with a pair of symmetrically arranged edges, the other of said units having a portion extending into said chamber and rotatable and endwise movable therein, said portion being provided with a movable clutch member having an edge and which clutch member can be reversed to position its edge at one side or the other of the clutch member for either right or left hand threading operations, said clutch member normally cooperatively engaging said elongated member to interconnect said units against relative rotation and to hold said elongated member against one side wall of said slot, said first unit and said clutch member having cooperating portions acting upon relative endwise movement between said units to move said clutch member to disengage it from said elongated member to free said units for relative rotation, and means carried by said first unit and acting on said elongated member to move the same against the other side wall of the slot when thus disengaged from said clutch member at which time the edges of the elongated member lie outside of the path of relative rotation of the edge of the clutch member.

JOSEPH F. ALLEN.